(12) United States Patent
Watabe

(10) Patent No.: US 11,127,155 B2
(45) Date of Patent: Sep. 21, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hiroyuki Watabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 16/570,850

(22) Filed: Sep. 13, 2019

(65) Prior Publication Data

US 2020/0105011 A1    Apr. 2, 2020

(30) Foreign Application Priority Data

Sep. 27, 2018 (JP) .............................. JP2018-182092

(51) Int. Cl.
| G06T 7/73 | (2017.01) |
| G06T 7/80 | (2017.01) |
| G06T 15/20 | (2011.01) |
| H04N 13/117 | (2018.01) |
| G06K 9/00 | (2006.01) |

(52) U.S. Cl.
CPC ............ G06T 7/73 (2017.01); G06K 9/00355 (2013.01); G06T 7/80 (2017.01); G06T 15/20 (2013.01); H04N 13/117 (2018.05)

(58) Field of Classification Search
CPC .. G06T 7/73; G06T 7/80; G06T 15/20; G06T 19/006; H04N 13/117; G06K 9/00355; G06K 9/00671; G06F 3/011
See application file for complete search history.

(56) References Cited

U.S. PATENT DOCUMENTS

| 10,393,827 | B2* | 8/2019 | Lacouture | G01R 33/07 |
| 2006/0248462 | A1* | 11/2006 | Ofek | G06F 3/038 |
| | | | | 715/730 |
| 2008/0228422 | A1* | 9/2008 | Satoh | G06F 3/011 |
| | | | | 702/92 |
| 2015/0153571 | A1* | 6/2015 | Ballard | G06F 3/0482 |
| | | | | 345/8 |
| 2015/0356789 | A1* | 12/2015 | Komatsu | G06T 7/74 |
| | | | | 345/633 |
| 2016/0344882 | A1* | 11/2016 | Tsujioka | G06F 3/011 |

FOREIGN PATENT DOCUMENTS

| JP | 4095320 B2 | 6/2008 |
| JP | 6295296 B2 | 3/2018 |

* cited by examiner

*Primary Examiner* — Christopher M Brandt
(74) *Attorney, Agent, or Firm* — Canon U.S.A., Inc. IP Division

(57) ABSTRACT

There is provided an information processing apparatus that displays an image on a display unit mounted with a position sensor, and includes a selection unit configured to select one of a sensor coordinate system of the position sensor and a coordinate system different from the sensor coordinate system, an acquisition unit configured to acquire information about a position output from the position sensor, in the coordinate system selected by the selection unit, and a control unit configured to display an image based on the information about the position acquired by the acquisition unit, on the display unit.

20 Claims, 9 Drawing Sheets

INFORMATION PROCESSING APPARATUS, INFORMATION PROCESSING METHOD, AND STORAGE MEDIUM

BACKGROUND

Field of the Disclosure

The present disclosure relates to an information processing apparatus that displays an image on a display unit mounted with a position sensor, and to an information processing method and a storage medium.

Description of the Related Art

As a technology for merging a real world and a virtual world in real time, a mixed reality (MR) technology and an augmented reality (AR) technology are known. These kinds of technologies seamlessly merge a real space and a virtual space created by a computer. These technologies are expected to be applied to various fields, including assembly support for displaying a superimposed work procedure or wiring status during assembly work, and surgery support for displaying an internal state of the body of a patient on a surface of the body by superimposition.

To align the real space and the virtual space accurately is one of serious issues to be solved in implementing the MR technology. Many efforts have been made to solve this issue. The issue of the alignment in the mixed reality leads to an issue of determining a three-dimensional position and an orientation of an object in a world coordinate system set in a real space (hereinbelow, simply referred to as "world coordinate system"). As a method of solving these issues, a position-and-orientation sensor, such as a magnetic sensor or an optical sensor, is usually used. In general, a value output by the position-and-orientation sensor represents the position-and-orientation of a measured point in a sensor coordinate system originally defined by the sensor, and this value does not represent the position-and-orientation of an object in the world coordinate system. Therefore, a coordinate transformation for transforming the sensor output value into the position-and-orientation of the object in the world coordinate system is necessary. Information for this coordinate transformation will be referred to as "calibration information" in the present disclosure.

In Japanese Patent No. 4095320, the calibration information is acquired without using a special calibration tool. Specifically, a feature point that can be detected from a captured image is manually set in the real space, and the calibration information is acquired by using the set feature point as known coordinates in the world coordinate system. This feature point is an index of a plane printed on a material such as paper. This index is placed on a surface, such as a floor surface, and the floor surface is used as a plane in the world coordinate system.

Meanwhile, there is a piece of software that establishes a mixed reality space, using the sensor output value in the sensor coordinate system, separately from a received value representing a position-and-orientation output by a piece of software that calculates a position-and-orientation of an object in the world coordinate system by calibration. This will be referred to as "composite system". In this composite system, it is necessary to use a coordinate system integrated with the sensor coordinate system. To this end, in Japanese Patent No. 6295296, an index for integrally using the world coordinate system and the sensor coordinate system is created.

There is a case where the world coordinate system determined after being calibrated based on the index printed on the paper distorts because this index is on the paper and thus has an inclination from the floor surface with respect to the real space. If the world coordinate system has such an inclination, a computer graphics (CG) image placed on the floor surface with no misalignment in a virtual reality space appears to be biting into the floor surface in the real space or floating above the floor surface, when viewed in the mixed reality space. Therefore, it is necessary that a coordinate system with no error with respect to the real space is the world coordinate system. It takes time to adjust this slight inclination manually, and it is difficult to adjust the inclination accurately.

In addition, in Japanese Patent No. 6295296, a special calibration tool is necessary, and there is such an issue that the world coordinate system inclines from the floor surface with respect to the real space as described above, in a case where the calibration tool is printed on a material such as paper.

SUMMARY

Various embodiments are directed to an information processing apparatus that displays an image at a display unit mounted with a position sensor, and that is capable of reducing trouble caused by setting of a coordinate system, when displaying an image based on an output of the position sensor on the display unit, and to an information processing method and a storage medium.

According to an aspect of some embodiments, an information processing apparatus that displays an image on a display unit mounted with a position sensor, includes a selection unit configured to select one of a sensor coordinate system of the position sensor and a coordinate system different from the sensor coordinate system, an acquisition unit configured to acquire information about a position output from the position sensor, in the coordinate system selected by the selection unit, and a control unit configured to display an image based on the information about the position acquired by the acquisition unit, on the display unit.

Further features of various embodiments will become apparent from the following description of exemplary embodiments with reference to the attached drawings.

DESCRIPTION OF THE EMBODIMENTS

A first exemplary embodiment will be described below with reference to the attached drawings.

In the present exemplary embodiment, in a case where a user observes a computer graphics (CG) image at a display, a position-and-orientation or a position of the display mounted with a position-and-orientation sensor or a position sensor is estimated based on calibration information calculated beforehand and a coordinate system set by the user. CG data is rendered by using the estimated position-and-orientation or the estimated position as a point of view of the user. The display may be a simple object. In this case, a virtual point of view may be prepared, and CG data may be rendered based on an estimated position-and-orientation or an estimated position of the object. The display may display an image of the rendered CG data. Further, the display may include an imaging device to generate a composite image by combining an image captured based on a position-and-orientation of the display and a CG image. Further, the generated composite image may be displayed to allow the user to be able to experience a mixed reality space. In the present exemplary embodiment, the position-and-orientation refers to a set of six parameters including three parameters representing a position and three parameters representing an orientation (direction). Also, in some embodiments, the position-and-orientation may instead be only a position.

An information processing apparatus according to the present exemplary embodiment acquires a position-and-orientation value in a sensor coordinate system output from a sensor, in a technique of estimating a position-and-orientation of a display mounted with a position-and-orientation sensor. Then, the information processing apparatus uses calibration information for a transformation from a sensor coordinate system calculated beforehand into a world coordinate system. Subsequently, the information processing apparatus estimates a position-and-orientation by changing to one of the sensor coordinate system or the world coordinate system based on a setting made by the user, and renders CG data based on the estimated position-and-orientation. The information processing apparatus then displays an image of the rendered CG data on the display.

Figure 5:
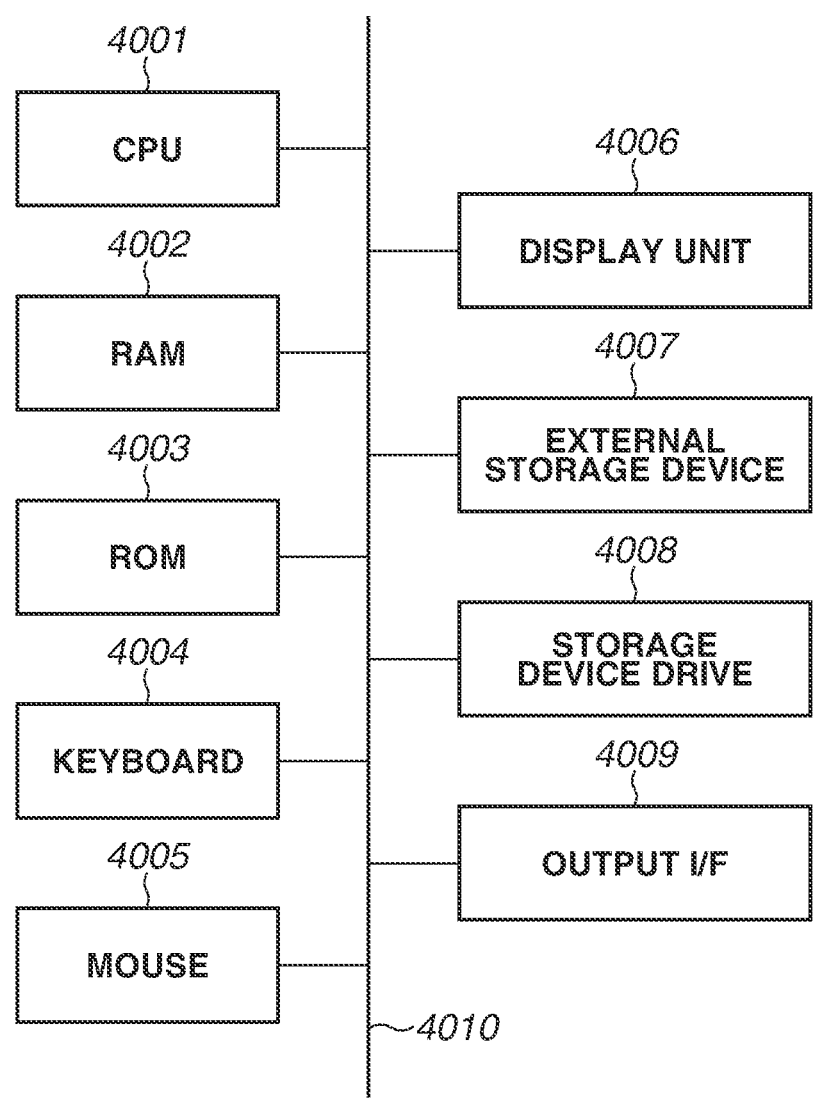
FIG. 5 is a block diagram illustrating a hardware configuration example according to the first exemplary embodiment.

FIG. 5 is a block diagram illustrating a hardware configuration of an information processing apparatus 1000 according to the present exemplary embodiment. In FIG. 5, a central processing unit (CPU) 4001 controls each device connected via a bus 4010. The CPU 4001 reads out processing steps or programs stored in a read only memory (ROM)) 4003, and executes the read-out processing steps or programs. The ROM 4003 stores software including an operating system (OS), each processing program according to the present exemplary embodiment, and device drivers. These pieces of software are temporarily stored into a random access memory (RAM) 4002 and are executed by the CPU 4001 as appropriate. Each of a keyboard 4004 and a mouse 4005 is provided as an input interface (I/F), and receives an input signal from a user in a form that can be processed by the information processing apparatus 1000. An output I/F 4009 outputs an output signal to an external device (the display device) in a form that can be processed by the external device.

Figure 1:
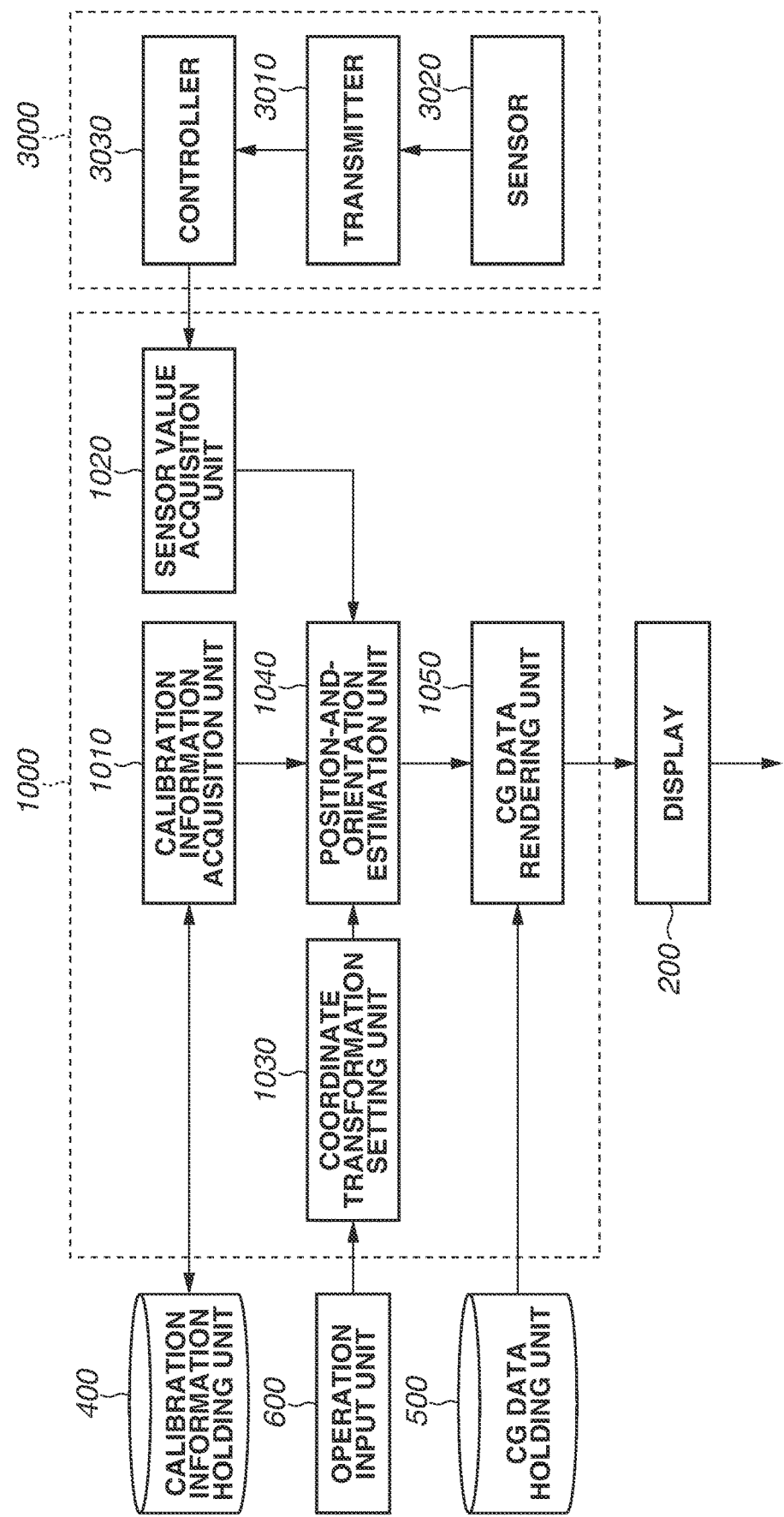
FIG. 1 is a block diagram illustrating a functional configuration of an information processing apparatus according to a first exemplary embodiment.

FIG. 1 is a block diagram illustrating a configuration of the information processing apparatus 1000 according to the present exemplary embodiment.

The information processing apparatus 1000 includes a calibration information acquisition unit 1010, a sensor value acquisition unit 1020, a coordinate transformation setting unit 1030, a position-and-orientation estimation unit 1040, and a CG data rendering unit 1050. The information processing apparatus 1000 is connected to a display 200 and a position-and-orientation sensor system 3000. In the present exemplary embodiment, the information processing apparatus 1000 is connected to the display 200 by wire or wirelessly. The display 200 is a head mounted display (HMD), and displays CG data rendered by the CG data rendering unit 1050. The display 200 may be a liquid crystal display or an organic electroluminescence (EL) display, and may be of any type as long as the display 200 can display an image of rendered CG data. As described above, the HMD is mounted with a sensor 3020, and a position-and-orientation of the display 200 is estimated based on a position-and-orientation of the sensor 3020 and calibration information to be described below. CG data is rendered by using the estimated position-and-orientation of the display 200 as a virtual point of view, and the rendered CG data is displayed, so that the user can experience a virtual reality space. Further, the HMD includes an imaging device to generate a composite image by combining an image of CG data and an image obtained by imaging with the imaging device, and the generated composite image may be displayed, so that the user can experience a mixed reality space.

Figure 2:
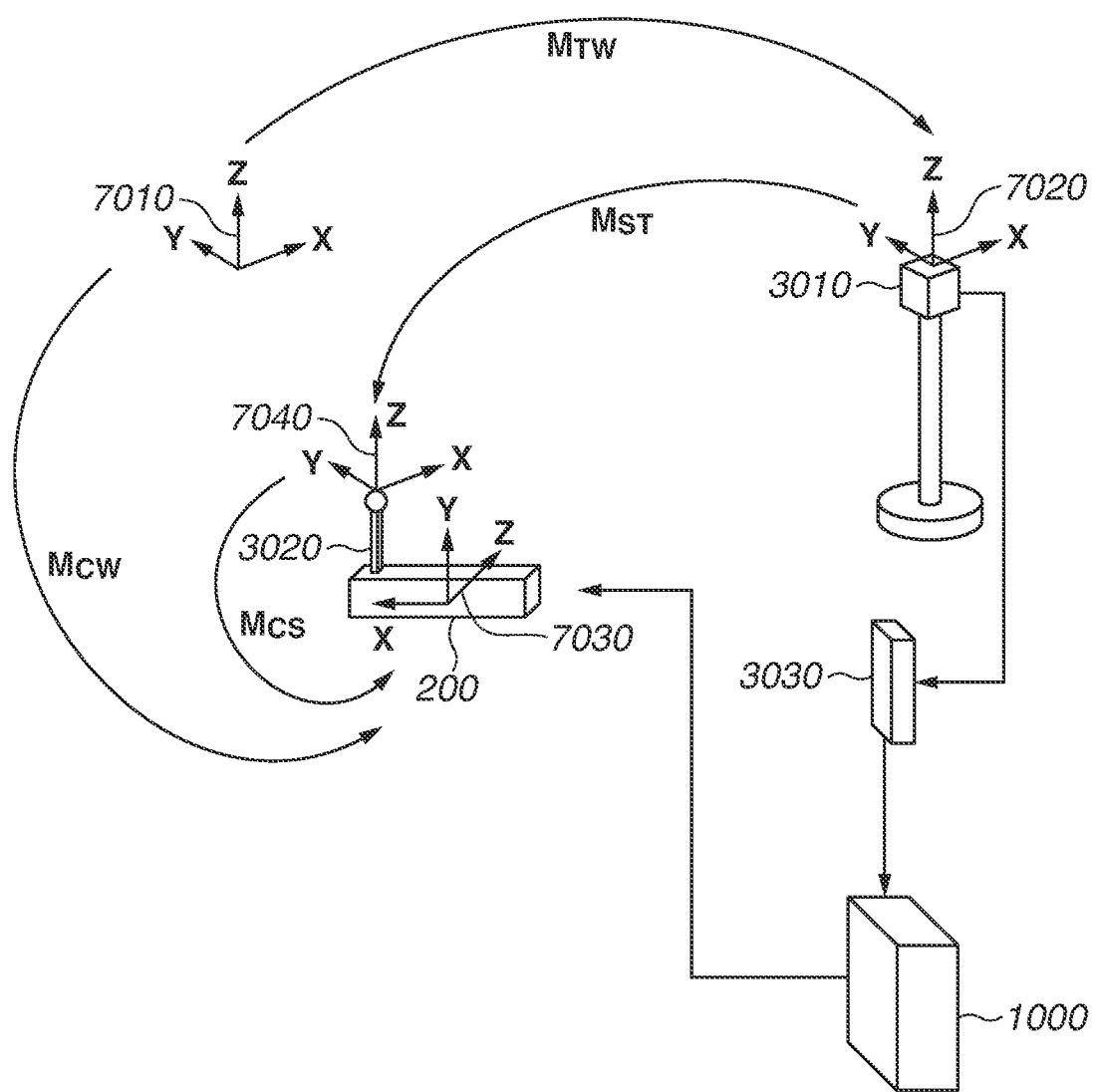
FIG. 2 is a diagram illustrating calibration information according to the first exemplary embodiment.

A calibration information holding unit 400 holds the calibration information. This calibration information will be described with reference to FIG. 2. First, a coordinate system in which one point in an environment is defined as a point of origin, and three axes orthogonal to each other, defined as an X-axis, a Y-axis, and a Z-axis, will be referred to as a world coordinate system 7010. Further, a coordinate system in which the center of the display 200 is set as a point of origin and three axes orthogonal to each other, defined as an X-axis, a Y-axis, and a Z-axis, will be referred to as a display coordinate system 7030. The calibration information is configured of a position-and-orientation $M_{TW}$ and a position-and-orientation $M_{CS}$. The position-and-orientation $M_{TW}$ is a transformation matrix of a position-and-orientation of a sensor coordinate system 7020 (described below), in the world coordinate system 7010. The position-and-orientation $M_{CS}$ is a transformation matrix of a position-and-orientation of the display coordinate system 7030 as viewed from a sensor measurement point 7040. In a case where the sensor measurement point 7040 is used as the display coordinate system 7030, information of the position-and-orientation $M_{CS}$ of the display coordinate system 7030 as viewed from the sensor measurement point 7040 is unnecessary. For example, these pieces of calibration information can be calculated by using a method discussed in Japanese Patent No. 4095320. To calculate the calibration information using the method discussed in Japanese Patent No. 4095320, it is necessary that the above-described display 200, mounted with the sensor, includes the imaging device. This calibration information may be calculated by using the method discussed in Japanese Patent No. 4095320 or may be calculated by other methods.

The calibration information acquisition unit 1010 acquires calibration information calibrated beforehand, from the calibration information holding unit 400. This calibration information is output to the position-and-orientation estimation unit 1040.

The sensor value acquisition unit 1020 consecutively acquires a position-and-orientation $M_{ST}$ of the sensor measurement point 7040 in the measured sensor coordinate system as a measurement target, from the position-and-orientation sensor system 3000. The position-and-orientation sensor system 3000 may be a position sensor system. For example, in a case where the position-and-orientation sensor system 3000 is a magnetic field sensor system, the sensor 3020 in the magnetic field sensor system is mounted on the display 200 used for estimating a position-and-orientation, and measures the own position-and-orientation as a measurement target. A transmitter 3010 serves as a transmitter in the magnetic field sensor system. The transmitter 3010 is disposed and fixed at a predetermined position in a real space, and generates a magnetic field around itself. A controller 3030 controls operation of the transmitter 3010, and the information processing apparatus 1000 controls operation of the controller 3030. The sensor 3020 measures a change in magnetic field based on the own position-and-orientation in the magnetic field generated by the transmitter 3010, and the sensor 3020 transmits a result of the measurement to the controller 3030. The controller 3030 generates a signal value indicating the position-and-orientation of the sensor 3020 in the sensor coordinate system 7020 from this result of the measurement, and the controller 3030 transmits the generated signal value to the information processing apparatus 1000. The sensor coordinate system 7020 is a coordinate system in which the position of the transmitter 3010 is set as a point of origin, and three axes orthogonal to each other at the point of origin are defined as an X-axis, a Y-axis, and a Z-axis. An ultrasonic sensor system or an optical sensor system may be used in place of the magnetic field sensor system, or the combination of these systems may be used. In a case where the optical sensor is used, the above-described sensor may use a spherical reflective marker as the measurement target. The above-described sensor may be any type of sensor as long as the sensor can acquire the position-and-orientation of the measurement point defined in the sensor coordinate system. The acquired position-and-orientation $M_{ST}$ of the sensor measurement point 7040 in the sensor coordinate system is output to the position-and-orientation estimation unit 1040.

An operation input unit 600 is a button for receiving an operation from the user. The operation input unit 600 may not be a button, and may be any type of unit as long as the unit can receive an operation from the user. For example, voice may be acquired by a microphone, or a gesture may be recognized.

Figure 3:
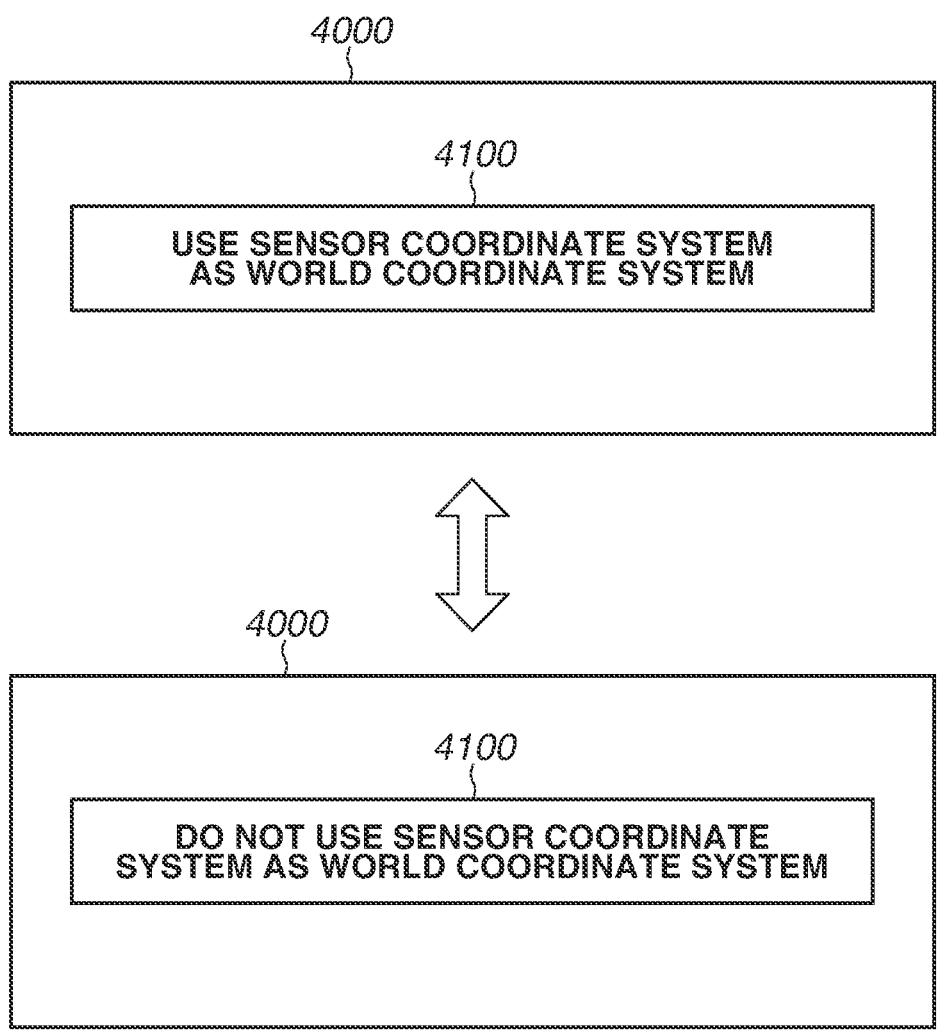
FIG. 3 is a diagram illustrating a user interface according to the first exemplary embodiment.

The coordinate transformation setting unit 1030 determines whether the position-and-orientation of the display 200 is to be output using the sensor coordinate system or the world coordinate system by the position-and-orientation estimation unit 1040. The user can make a setting for this determination by providing an input in the operation input unit 600, using a graphical user interface. In a case where the world coordinate system does not match the real space and has an inclination that cannot be adjusted, it is necessary for the user to select a coordinate system more suitable for the real space. Alternatively, there is a case where the user desires to make the setting so that the position-and-orientation of the display coordinate system 7030 in the sensor coordinate system can be acquired based on a software configuration. Therefore, a user interface is provided so that the user can make the setting. For example, the user interface may be a graphical user interface. The graphical user interface may have, for example, a toggle button 4100 as in a graphical user interface 4000 illustrated in FIG. 3, and a sentence of the toggle button 4100 may be changed by pressing the toggle button 4100. The sentence of the toggle button 4100 is an example, and may be any sentence, as long as which coordinate system is set can be understood from this sentence. Instead of the sentence, an icon expressing a button may be used. The user interface is not limited to the graphical user interface 4000. The user interface may be configured to be able to make a setting by voice, or a button may be provided in the HMD and a change may be made by using this button. Switching between the world coordinate system and the sensor coordinate system is performed based on the setting made by the user, so that the position-and-orientation estimation unit 1040 determines the position-and-orientation of the display coordinate system 7030 based on the set coordinate system and outputs the determined position-and-orientation. The coordinate transformation setting unit 1030 outputs information indicating the coordinate system after the switching, to the position-and-orientation estimation unit 1040.

In a case where the setting is made to output the position-and-orientation of the display coordinate system 7030 using the world coordinate system 7010, the position-and-orientation estimation unit 1040 can determine a position-and-orientation $M_{CW}$ of the display coordinate system 7030 in the world coordinate system 7010, for example as described by an expression (A).

$$M_{CW}=M_{CS} \times M_{ST} \times M_{TW} \qquad (A)$$

In a case where the coordinate transformation setting unit 1030 has made the setting for outputting the position-and-orientation of the display coordinate system 7030 using the sensor coordinate system 7020, the position-and-orientation estimation unit 1040 can determine the position-and-orientation of the display coordinate system 7030 with the sensor coordinate system 7020, for example as described by an expression (B) or an expression (C).

$$M_{CT}=M_{CW} \times M_{TW}^{-1} \qquad (B)$$

$$M_{CT}=M_{CS} \times M_{ST} \qquad (C)$$

The position-and-orientation of the display coordinate system 7030 determined as described by the above-described expression (A), expression (B), or expression (C) is output to the CG data rendering unit 1050.

A CG data holding unit 500 holds CG data to be rendered. The format of the CG data may be any type of format as long as the format allows rendering of CG data as a CG image.

The CG data rendering unit 1050 acquires the CG data to be rendered from the CG data holding unit 500, sets the position-and-orientation of the display coordinate system 7030 output by the position-and-orientation estimation unit 1040 as the position-and-orientation of a virtual camera, and renders the CG data. In a case where the position-and-orientation of the CG data is held in the world coordinate system, and in a case where the position-and-orientation of the position-and-orientation estimation unit 1040 is output in the sensor coordinate system, it is necessary to transform the position-and-orientation of the CG data into the sensor coordinate system. To this end, $M_{TW} \times M_{CG}$ data may be determined by multiplying position-and-orientation $M_{CG}$ data of the CG data by the above-described position-and-orientation $M_{TW}$. Virtual reality can be realized by rendering the CG data and generating a virtual real space image, and presenting the generated virtual real space image to the user.

Further, the display 200 includes the imaging device to generate a composite image by rendering the CG data combined on an image acquired by the imaging device, and the generated composite image is presented to the user, so that mixed reality can be realized. The image thus generated is output to the display 200.

Figure 4:
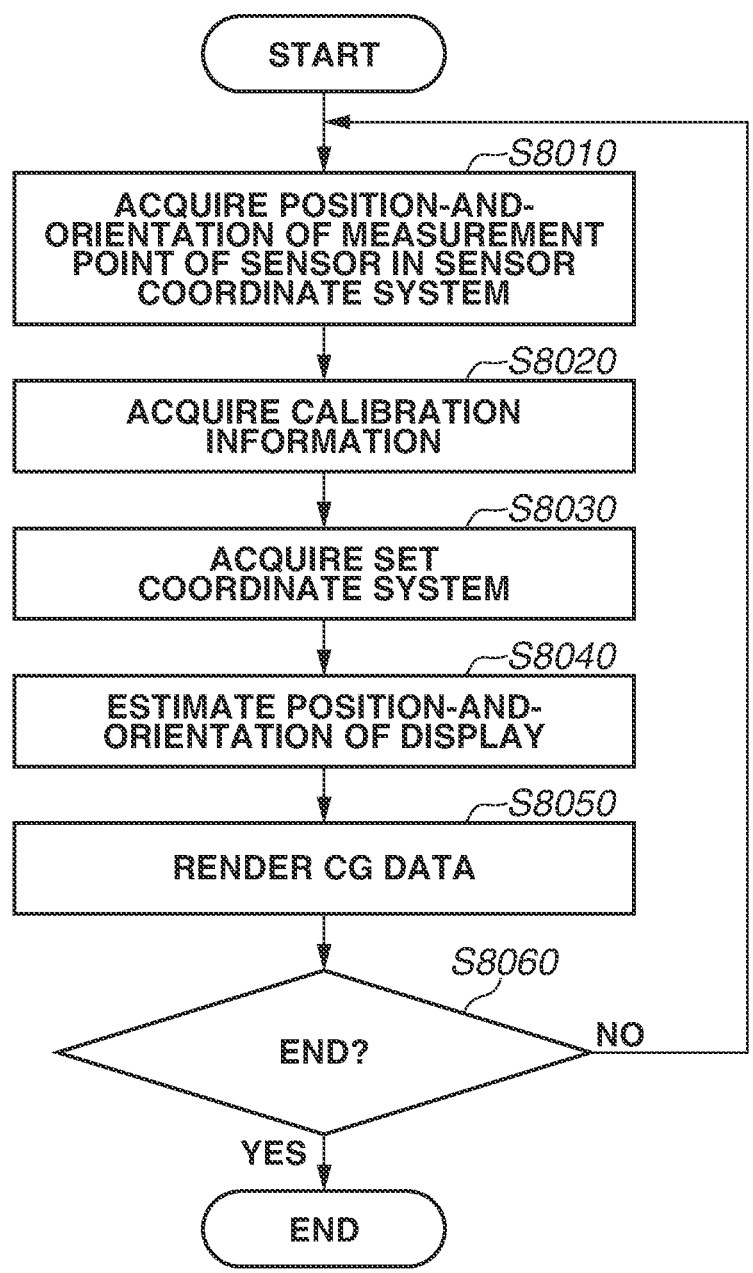
FIG. 4 is a flowchart illustrating an operation of each functional unit of the information processing apparatus.

Next, a processing procedure performed by the information processing apparatus 1000 according to the first exemplary embodiment will be described. FIG. 4 is a flowchart illustrating the processing procedure performed by the information processing apparatus 1000 according to the first exemplary embodiment.

In S8010, the sensor value acquisition unit 1020 acquires the position-and-orientation $M_{ST}$ of the sensor measurement point 7040 in the sensor coordinate system. The sensor value acquisition unit 1020 outputs the acquired information to the position-and-orientation estimation unit 1040.

In S8020, the calibration information acquisition unit 1010 acquires the calibration information, i.e., the position-and-orientation $M_{TW}$ of the sensor coordinate system 7020 in the world coordinate system 7010, and the position-and-orientation $M_{CS}$ of the display coordinate system 7030 as viewed from the sensor measurement point 7040. The calibration information acquisition unit 1010 outputs the acquired information to the position-and-orientation estimation unit 1040.

In S8030, the coordinate transformation setting unit 1030 determines whether to estimate the position-and-orientation in the world coordinate system set by the user or the position-and-orientation in the sensor coordinate system, and outputs the result of the determination to the position-and-orientation estimation unit 1040.

In S8040, the position-and-orientation estimation unit 1040 outputs the position-and-orientation $M_{CW}$ or $M_{CT}$ of the display coordinate system 7030 in the coordinate system set in S8030 to the CG data rendering unit 1050.

In S8050, the CG data rendering unit 1050 renders the CG data, by acquiring the CG data to be rendered from the CG data holding unit 500, and setting the position-and-orientation of the display coordinate system 7030 output by the position-and-orientation estimation unit 1040, as the position-and-orientation of the virtual camera. In a case where only the CG data is to be rendered, virtual reality can be realized. Further, the display 200 includes the imaging device to realize mixed reality by generating a composite image by combining and rendering the CG data on an image acquired by the imaging device, and presenting the generated composite image to the user.

In S8060, whether to terminate the processing is determined. If the processing is to be terminated (YES in S8060), this flow ends. If the processing is to be continued (NO in S8060), the processing returns to S8010.

As described above, in a case where the user observes the CG image on the display, the position-and-orientation of the display mounted with the position-and-orientation sensor or the position sensor is estimated based on the calibration information calculated beforehand and the coordinate system set by the user. The user can thereby use a coordinate system more suitable for the real space.

In the first exemplary embodiment, virtual reality is realized by rendering the CG data using the estimated position-and-orientation of the display. However, what can be realized by using the position-and-orientation of the display is not limited to the CG rendering. In a second exemplary embodiment, a warning is displayed by using the position-and-orientation of the display, when the user approaches a hazardous area.

Points different from the first exemplary embodiment will be mainly described below, and other points are assumed to be similar to the first exemplary embodiment unless otherwise specified.

Figure 6:
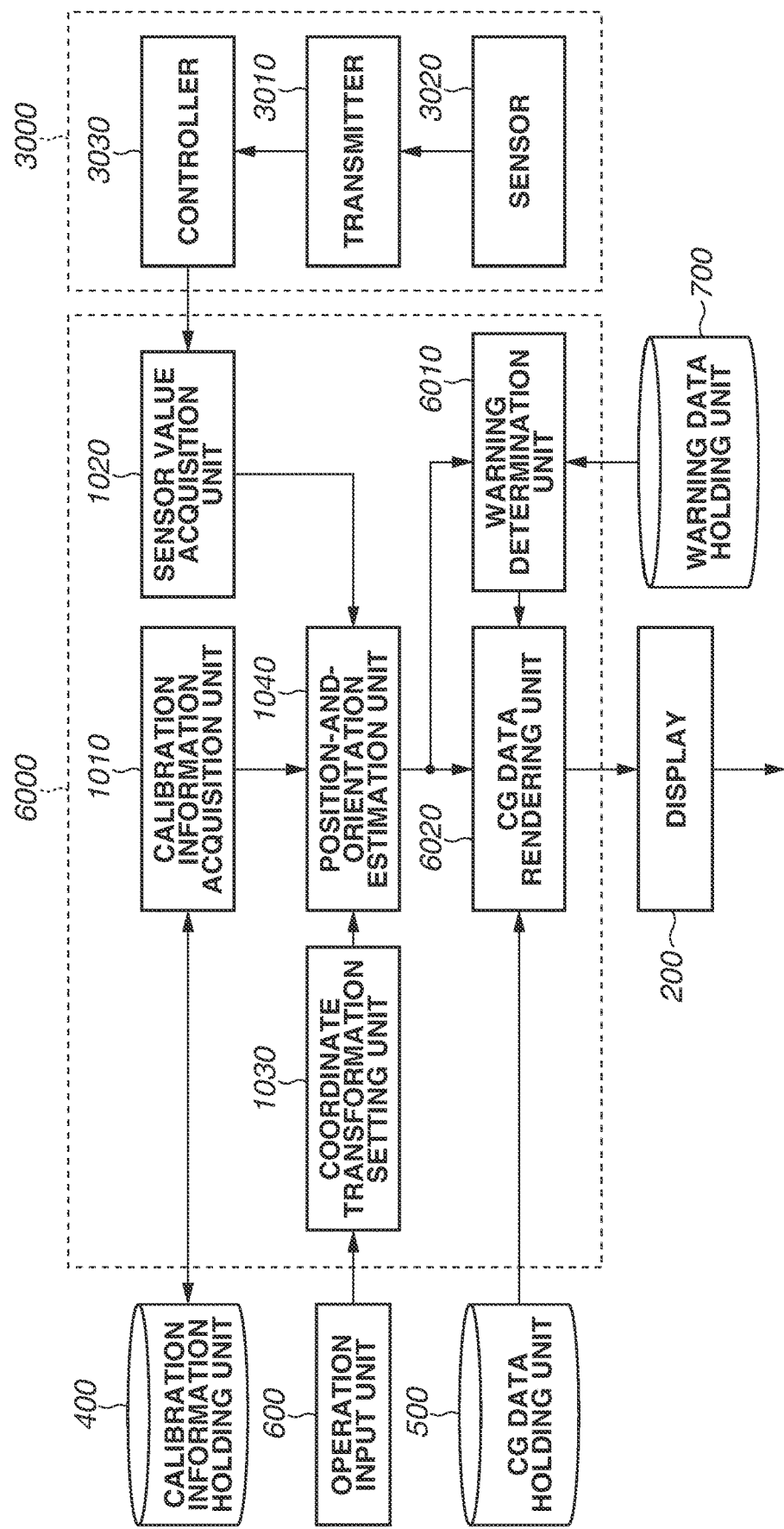
FIG. 6 is a functional block diagram illustrating a configuration of an information processing apparatus according to a second exemplary embodiment.

A configuration example of a system according to the present exemplary embodiment will be described with reference to a block diagram in FIG. 6. An information processing apparatus 6000 has a configuration made by adding a warning determination unit 6010 and a warning data holding unit 700 to the information processing apparatus 1000 in FIG. 1. The warning data holding unit 700 holds a plurality of pieces of data in which a coordinate point (e.g., warning data and a dangerous range) in the world coordinate system 7010 are defined.

The warning determination unit 6010 acquires a plurality of pieces of warning data from the warning data holding unit 700. Further, the warning determination unit 6010 acquires the position-and-orientation of the display coordinate system 7030 output from the position-and-orientation estimation unit 1040. The warning determination unit 6010 outputs a signal to cause a CG data rendering unit 6020 to display a warning, in a case where a position-and-orientation of the display coordinate system 7030 in the world coordinate system falls within in a warning range calculated from the warning data. The warning range is defined by a coordinate point W (x, y, z, 1) of the warning data and within a radius r[m] around the coordinate point. In a case where the position-and-orientation of the display coordinate system 7030 falls within this range, the warning determination unit 6010 outputs a signal to cause the CG data rendering unit 6020 to display the warning.

In a case where the position-and-orientation of the display coordinate system 7030 is a position-and-orientation in the sensor coordinate system, the warning determination unit 6010 multiplies the coordinate point W (x, y, z, 1) by the position-and-orientation $M_{TW}$, and then determines whether the position-and-orientation is within the radius r[m] around the calculated coordinate point W. In a case where the position-and-orientation is within the radius r[m], the warning determination unit 6010 outputs the signal to cause the CG data rendering unit 6020 to display the warning.

The CG data rendering unit 6020 acquires the CG data to be rendered from the CG data holding unit 500, as with the CG data rendering unit 1050. Then, the CG data rendering unit 6020 renders the CG data, by setting the position-and-orientation of the display coordinate system 7030 output by the position-and-orientation estimation unit 1040, as the position-and-orientation of the virtual camera. Further, in a case where the signal to display a warning is output from the warning determination unit 6010, the CG data rendering unit 6020 displays a sentence or icon representing the warning on the display. The user thereby immediately understands that the user is approaching the hazardous area. The warning may also be notified by sound, voice, or vibration, other than the display of the sentence or icon.

Figure 7:
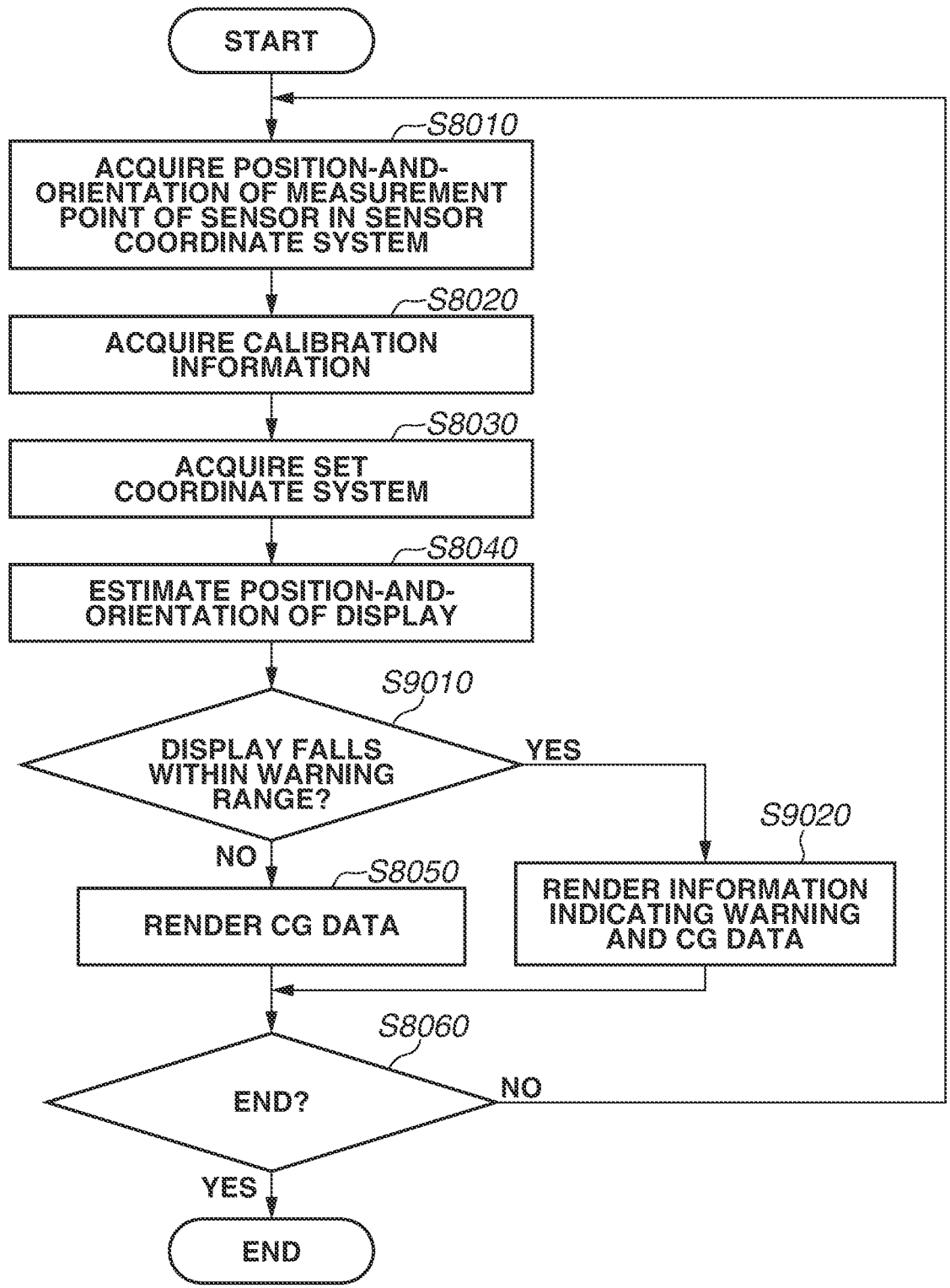
FIG. 7 is a flowchart illustrating a processing procedure of the information processing apparatus according to the second exemplary embodiment.

In the present exemplary embodiment, FIG. 7 is a flowchart illustrating a processing procedure performed by the information processing apparatus 6000 according to the second exemplary embodiment. In S9010, the warning determination unit 6010 determines whether the display coordinate system 7030 falls within the warning range. If the display coordinate system 7030 falls within the warning range (YES in S9010), the processing proceeds to S9020. If the display coordinate system 7030 does not fall within the warning range (NO in S9010), the processing proceeds to S8050. In S9020, the CG data rendering unit 6020 displays the CG data and the sentence or icon representing the warning. As described above, the user can be notified of danger, in the case where the display falls within the warning range. In a case where the display is the HMD, a field of view is narrow, and thus, the user is highly likely to be unaware of danger. The above processing enables the user to avoid encountering a dangerous situation even in the state where the user is wearing the HMD.

In the first and second exemplary embodiments, whether to estimate the position-and-orientation of the display in the world coordinate system or the sensor coordinate system is determined by the setting made by the user, so that the user can experience the virtual reality space. However, it is necessary for the user to set the coordinate system consciously, which is troublesome. In a third exemplary embodiment, in a case where there is a possibility that the set coordinate system does not match the real space, the user is notified of this possibility.

Points different from the first exemplary embodiment will be mainly described below, and other points are assumed to be similar to the first exemplary embodiment unless otherwise specified.

The position-and-orientation estimation unit 1040 estimates the position-and-orientation of the display coordinate system 7030 in the coordinate system based on the user setting as in the first exemplary embodiment. Further, in the present exemplary embodiment, the position-and-orientation estimation unit 1040 determines whether the coordinate system set by the user matches the real space. In a case where there is a possibility that the coordinate system set by the user does not match the real space, the position-and-orientation estimation unit 1040 outputs this possibility to the CG data rendering unit 1050. The determination as to whether the coordinate system matches the real space will be described below. First, assume that the world coordinate system or the sensor coordinate system is to be set on a floor surface or wall surface in the real space. In such a situation, in a case where a rotation of the position-and-orientation $M_{TW}$ of the sensor coordinate system 7020 around any one of the X-axis, the Y-axis, and the Z-axis in the world coordinate system 7010 is greater than or equal to 90×Z degree±threshold (Z is an integer), either the world coordinate system or the sensor coordinate system may have an error with respect to the surface of the real space. Therefore, the position-and-orientation estimation unit 1040 outputs the possibility that the current coordinate system does not match the real space, to the CG data rendering unit 1050. The above-described threshold is set beforehand by the user.

In addition, whether the coordinate system matches the real space may be determined by a method other than the above-described method. For example, whether the coordinate system matches the real space may be determined by estimating a plane using a depth camera capable of acquiring distance information of a subject, and determining whether a plane of the currently set coordinate system is misaligned with the estimated plane. For this determination, some embodiments mount the depth camera with a position-and-orientation sensor as well, and calculate the calibration information of the depth camera, using the method of Japanese Patent No. 4095320. After a position-and-orientation of the depth camera in the world coordinate system is determined, a plane in the world coordinate system is estimated, and a misalignment with respect to an XY plane, a YZ plane, and an XZ plane of the set coordinate system is determined. This misalignment is determined by determining whether an angle formed by a vector perpendicular to the plane and each of the X-axis, the Y-axis, and the Z-axis of the set coordinate system is more than or equal to a threshold. If the angle is more than or equal to the threshold, the position-and-orientation estimation unit 1040 outputs information indicating that there is a possibility that the currently set coordinate system does not match the real space, to the CG data rendering unit 1050.

The CG data rendering unit 1050 renders the CG data as in the first exemplary embodiment. Further, in the present exemplary embodiment, in a case where the position-and-orientation estimation unit 1040 has output a determination indicating that the current coordinate system does not match the real space, the CG data rendering unit 1050 generates a composite image and outputs the generated composite image to the display. The CG data rendering unit 1050 generates the composite image by combining a sentence stating "Please check the current coordinate system." with an image of the rendered CG data. This sentence may be any type of notification as long as this notification prompts the user to check the coordinate system. For example, an image such as an icon may be displayed, or the user may be notified by sound or voice. Here, in a case where the user has already input information indicating that the user has checked the coordinate system into the operation input unit 600, the sentence may not be output.

Figure 8:
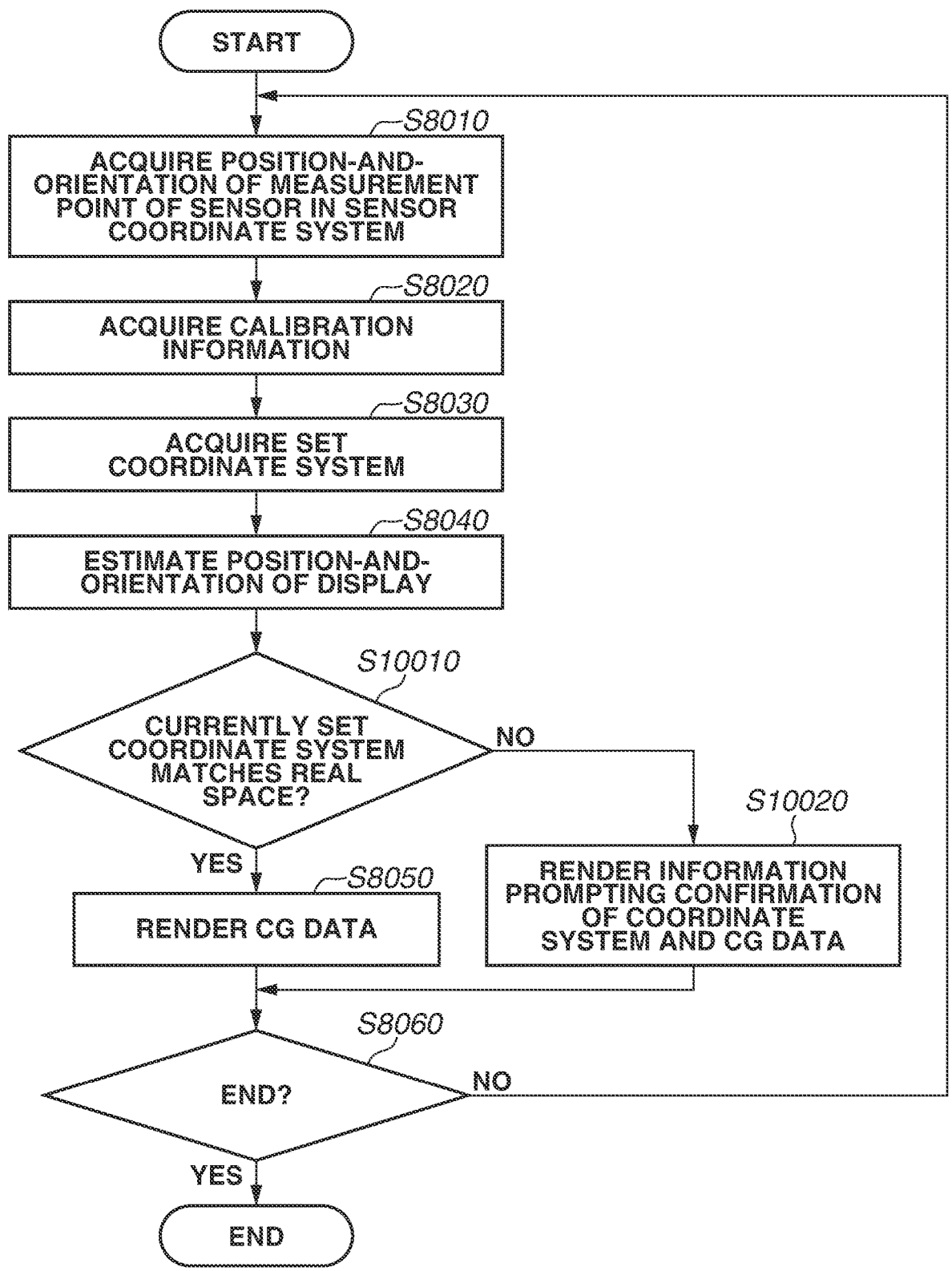
FIG. 8 is a flowchart illustrating a processing procedure of an information processing apparatus according to a third exemplary embodiment.

FIG. 8 is a flowchart illustrating a processing procedure performed by the information processing apparatus 1000 according to the third exemplary embodiment.

In S10010, the position-and-orientation estimation unit 1040 determines whether the coordinate system set by the user matches the real space. If the position-and-orientation estimation unit 1040 determines that the coordinate system does not match the real space (NO in S10010), the processing proceeds to S10020. If the position-and-orientation estimation unit 1040 determines that the coordinate system matches the real space (YES in S10010), the processing proceeds to S8050.

In S10020, the CG data rendering unit 1050 renders the CG data and the sentence or icon that prompts checking the coordinate system.

As described above, in a case where there is a possibility that the coordinate system has an error with respect to the real space, the user is notified of this possibility. With this notification, the user can start observing the CG data through the display, without worrying about whether the set coordinate system is appropriate. In a case where there is a problem, the user is notified of the problem, so that the user only has to check the setting when notified.

In the third exemplary embodiment, in a case where there is a possibility that the set coordinate system does not match the real space, the user is notified of the possibility. However, it is necessary for the user to set the coordinate system, which is troublesome. In a fourth exemplary embodiment, in a case where the set coordinate system does not match the real space, the coordinate system is automatically changed.

A point different from the first exemplary embodiment will be mainly described below, and other points are assumed to be similar to those in the first exemplary embodiment unless otherwise specified.

The position-and-orientation estimation unit 1040 determines whether the coordinate system set by the user matches the real space in the above-described manner. If the coordinate system does not match the real space, the currently set coordinate system is automatically changed to the other coordinate system. For example, in a case where the world coordinate system is set, the world coordinate system is changed to the sensor coordinate system. In a case where the sensor coordinate system is set, the sensor coordinate system is changed to the world coordinate system. At that time in a case where the coordinate system has been already automatically changed, it is not necessary to change the coordinate system regardless of the determination as to whether the coordinate system matches the real space. Then, the position-and-orientation estimation unit 1040 outputs the position-and-orientation of the display coordinate system 7030 based on the determined coordinate system, to the CG data rendering unit 1050. In addition, in the case where the coordinate system is automatically changed, the position-and-orientation estimation unit 1040 also notifies information indicating that the coordinate system has been already changed, to the CG data rendering unit 1050.

The CG data rendering unit 1050 renders the CG data as in the first exemplary embodiment. Further, in a case where the position-and-orientation estimation unit 1040 has output the information indicating that the coordinate system is automatically changed, the CG data rendering unit 1050 generates a sentence stating "The set coordinate system (the world coordinate system) has been changed to the sensor coordinate system." by superimposing the sentence on the screen and outputs it to the display. This sentence may be any type of notification if this notification enables the user to understand that the coordinate system is automatically changed. For example, an image such as an icon may be displayed, or the user may be notified by sound, voice, or vibration. In this case, in a case where the user has already input information indicating that the user has checked the coordinate system into the operation input unit 600, the sentence may not be output.

Figure 9:
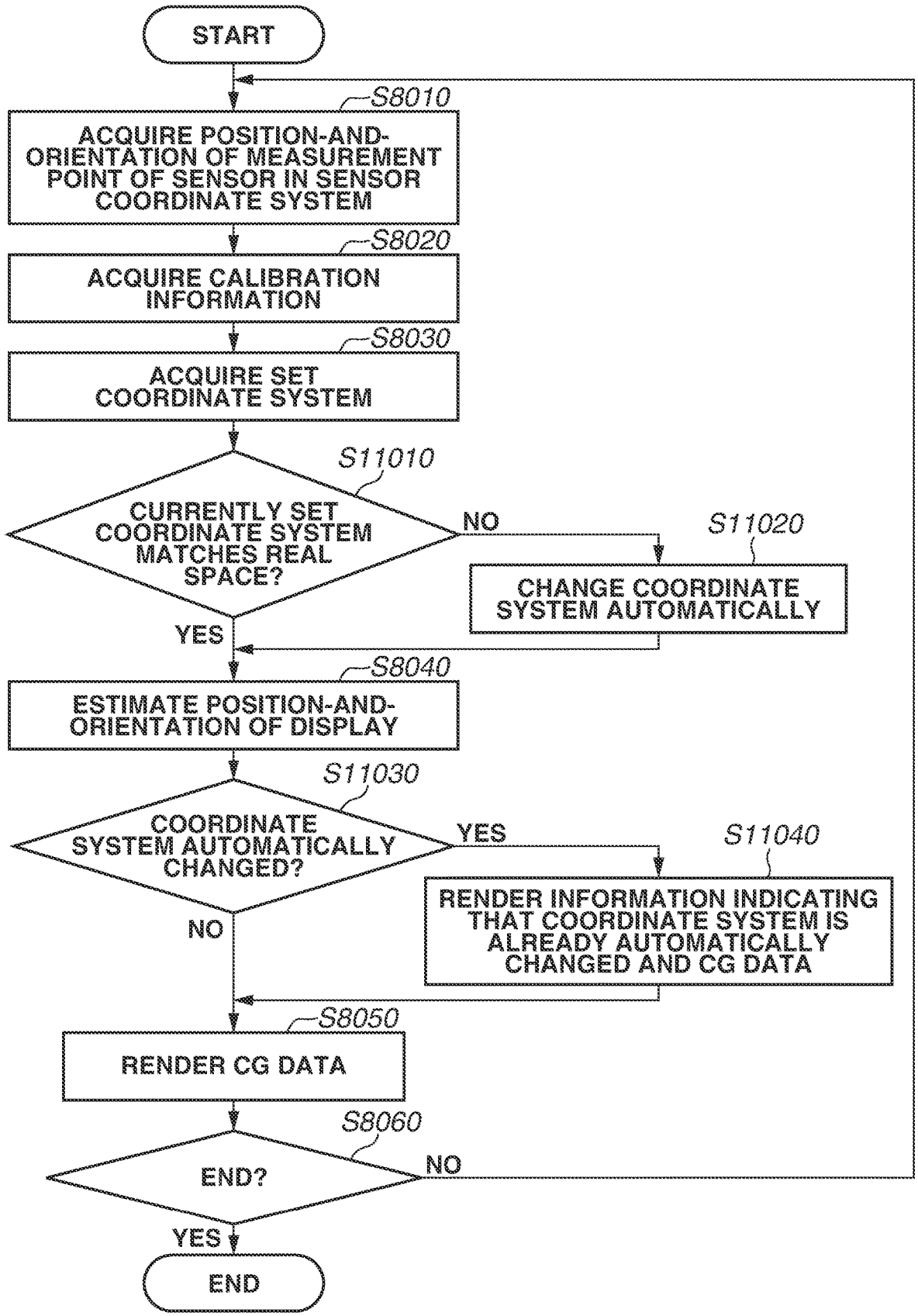
FIG. 9 is a flowchart illustrating a processing procedure of an information processing apparatus according to a fourth exemplary embodiment.

In the present exemplary embodiment, FIG. 9 is a flowchart illustrating a processing procedure of the information processing apparatus 1000 according to the fourth exemplary embodiment.

In S11010, the position-and-orientation estimation unit 1040 determines whether the coordinate system set by the user matches the real space. If the position-and-orientation estimation unit 1040 determines that the coordinate system does not match the real space (NO in S11010), the processing proceeds to S11020. If the position-and-orientation estimation unit 1040 determines that the coordinate system matches the real space (YES in S11010), the processing proceeds to S8040.

In S11020, the position-and-orientation estimation unit 1040 automatically changes the currently set coordinate system to the coordinate system different from the set coordinate system.

In S11030, the CG data rendering unit 1050 determines whether information indicating that the coordinate system is automatically changed is received from the position-and-orientation estimation unit 1040. If the coordinate system is automatically changed (YES in S11030), the processing proceeds to S11040. If the coordinate system is not automatically changed (NO in S11030), the processing proceeds to S8050.

In S11040, the CG data rendering unit 1050 renders the information indicating that the coordinate system is automatically changed and the CG data.

As described above, in a case where there is a possibility that the coordinate system has an error with respect to the real space, the coordinate system can be automatically changed. In this way, the user can start observing the CG data, without being conscious of the setting of the coordinate system.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-182092, which was filed on Sep. 27, 2018 and which is hereby incorporated by reference herein in its entirety.

What is claimed is:

1. An information processing apparatus that displays an image on a display unit mounted with a position sensor, the information processing apparatus comprising:
   a selection unit configured to select one of a sensor coordinate system of the position sensor and a coordinate system different from the sensor coordinate system;
   an acquisition unit configured to acquire information about a position output from the position sensor, in the coordinate system selected by the selection unit; and
   a control unit configured to display an image based on the information about the position acquired by the acquisition unit, on the display unit.

2. The information processing apparatus according to claim 1, wherein the acquisition unit acquires the information about the position output from the position sensor, by performing a transformation using at least one of a first matrix for performing a transformation between the sensor coordinate system and the coordinate system different from the sensor coordinate system, and a second matrix for performing a transformation between the sensor coordinate system and a coordinate system of the display unit.

3. The information processing apparatus according to claim 2, wherein the acquisition unit acquires the information about the position output from the position sensor by performing the transformation using the first matrix, in a case where the sensor coordinate system of the position sensor is selected by the selection unit.

4. The information processing apparatus according to claim 1,
wherein the information processing apparatus displays a user interface on the display unit, and
wherein the selection unit selects the coordinate system, based on information of setting made on the user interface.

5. The information processing apparatus according to claim 4, wherein the user interface has a toggle button, and switching between the sensor coordinate system of the position sensor and the coordinate system different from the sensor coordinate system is performed each time the toggle button is pressed.

6. The information processing apparatus according claim 1, wherein the selection unit selects the coordinate system, based on information of voice.

7. The information processing apparatus according claim 1, wherein the selection unit selects the coordinate system, based on a result of recognizing a gesture.

8. The information processing apparatus according to claim 2, further comprising:
a determination unit configured to determine whether a rotation of the first matrix around any one of an X-axis, a Y-axis, and a Z-axis is more than or equal to a threshold; and
a notification unit configured to provide a notification to a user, in a case where the determination unit determines that the rotation is more than or equal to the threshold.

9. The information processing apparatus according to claim 8, wherein switching between the sensor coordinate system of the position sensor and the coordinate system different from the sensor coordinate system is performed, in the case where the determination unit determines that the rotation is more than or equal to the threshold.

10. The information processing apparatus according to claim 8,
wherein the determination unit estimates a plane, and
wherein the determination unit determines a misalignment between each of an XY plane, a YZ plane, and an XZ plane of at least one of the sensor coordinate system of the position sensor and the coordinate system different from the sensor coordinate system, and the estimated plane.

11. The information processing apparatus according to claim 10, wherein the misalignment of the plane is determined by determining whether an angle is more than or equal to a threshold, the angle being formed by each of an X-axis, a Y-axis, and a Z-axis of at least one of the sensor coordinate system of the position sensor and the coordinate system different from the sensor coordinate system and a vector perpendicular to the estimated plane.

12. The information processing apparatus according to claim 1,
wherein the information processing apparatus includes the display unit, and
wherein the information processing apparatus generates an image of a virtual reality space from a virtual point of view, by rendering a position-and-orientation of the display unit as a position-and-orientation of computer graphics (CG) data, and displays the generated image on the display unit.

13. The information processing apparatus according to claim 1,
wherein the display unit is a head mounted display (HMD), and
wherein the HMD displays a CG image in which a position of the HMD is a virtual point of view.

14. The information processing apparatus according to claim 13,
wherein the HMD has an imaging device, and
wherein the HMD generates a composite image, by combining a CG image in which a position of the HMD is a virtual point of view, with an image obtained from the imaging device, and displays the composite image.

15. The information processing apparatus according to claim 1, further comprising:
a determination unit configured to determine whether the display unit falls within a range of a warning, using a position of the display unit, the range being set by the information processing apparatus; and
a notification unit configured to notify a user of the warning, in a case where the determination unit determines that the display unit falls within the range of the warning.

16. An information processing method for displaying an image on a display unit mounted with a position sensor, the information processing method comprising:
selecting one of a sensor coordinate system of the position sensor and a coordinate system different from the sensor coordinate system;
acquiring information about a position output from the position sensor, in the coordinate system selected by the selection unit; and
controlling the display unit to display an image thereon based on the acquired information about the position.

17. The information processing method according to claim 16, wherein the information about the position output from the position sensor is acquired by performing a transformation using at least one of a first matrix for performing a transformation between the sensor coordinate system and the coordinate system different from the sensor coordinate system, and a second matrix for performing a transformation between the sensor coordinate system and a coordinate system of the display unit.

18. The information processing method according to claim 17, wherein the information about the position output from the position sensor is acquired by performing the transformation using the first matrix, in a case where the sensor coordinate system of the position sensor is selected.

19. The information processing method according to claim 16,
wherein a user interface is displayed on the display unit, and
wherein the coordinate system is selected based on information of setting made on the user interface.

20. A non-transitory storage medium storing a program causing a computer to execute a method, the method comprising:
selecting one of a sensor coordinate system of a position sensor mounted on a display unit and a coordinate system different from the sensor coordinate system;
acquiring information about a position output from the position sensor, in the selected coordinate system; and
controlling the display unit to display an image thereon based on the acquired information about the position.

* * * * *